(12) United States Patent
Murilo Haustein et al.

(10) Patent No.: US 11,285,414 B2
(45) Date of Patent: Mar. 29, 2022

(54) SELF-CLEANING FILTRATION SYSTEM FOR USE IN AGRICULTURAL SPRAYERS

(71) Applicant: Ruch Murilo Haustein, Cascavel (BR)

(72) Inventors: Ruch Murilo Haustein, Cascavel (BR); Rogerio Slompo, Cascavel (BR)

(73) Assignee: Ruch Murilo Haustein, Cascavel (BR)

( * ) Notice: Subject to any disclaimer, the term of this patent is extended or adjusted under 35 U.S.C. 154(b) by 0 days.

(21) Appl. No.: 16/758,492

(22) PCT Filed: Dec. 11, 2017

(86) PCT No.: PCT/BR2017/000143
§ 371 (c)(1),
(2) Date: Apr. 23, 2020

(87) PCT Pub. No.: WO2019/079864
PCT Pub. Date: May 2, 2019

(65) Prior Publication Data
US 2020/0246738 A1    Aug. 6, 2020

(30) Foreign Application Priority Data
Oct. 23, 2017 (BR) ........................ 1020170228398A

(51) Int. Cl.
*B01D 37/04* (2006.01)
*B01D 29/60* (2006.01)
*B01D 35/22* (2006.01)

(52) U.S. Cl.
CPC ............. *B01D 37/04* (2013.01); *B01D 29/60* (2013.01); *B01D 35/22* (2013.01)

(58) Field of Classification Search
None
See application file for complete search history.

(56) References Cited

U.S. PATENT DOCUMENTS

| 7,192,528 B2 * | 3/2007 | Prochaska | B01D 29/66 210/798 |
| 2013/0255202 A1 * | 10/2013 | Shamir | B01D 29/114 55/303 |

* cited by examiner

*Primary Examiner* — Richard C Gurtowski
(74) *Attorney, Agent, or Firm* — Nixon & Vanderhye

(57) ABSTRACT

The following abstract of the invention concerns the development of a filtration system applied to agricultural sprayers so that the operator does not come into contact with residues from the applied product, having a cooperative system of a filtering element (14) and a settling filter (36), where the system is managed by an electronic module (41), having obstruction sensors that indicate the need for self-cleaning and recommend the time it should be replaced.

1 Claim, 13 Drawing Sheets

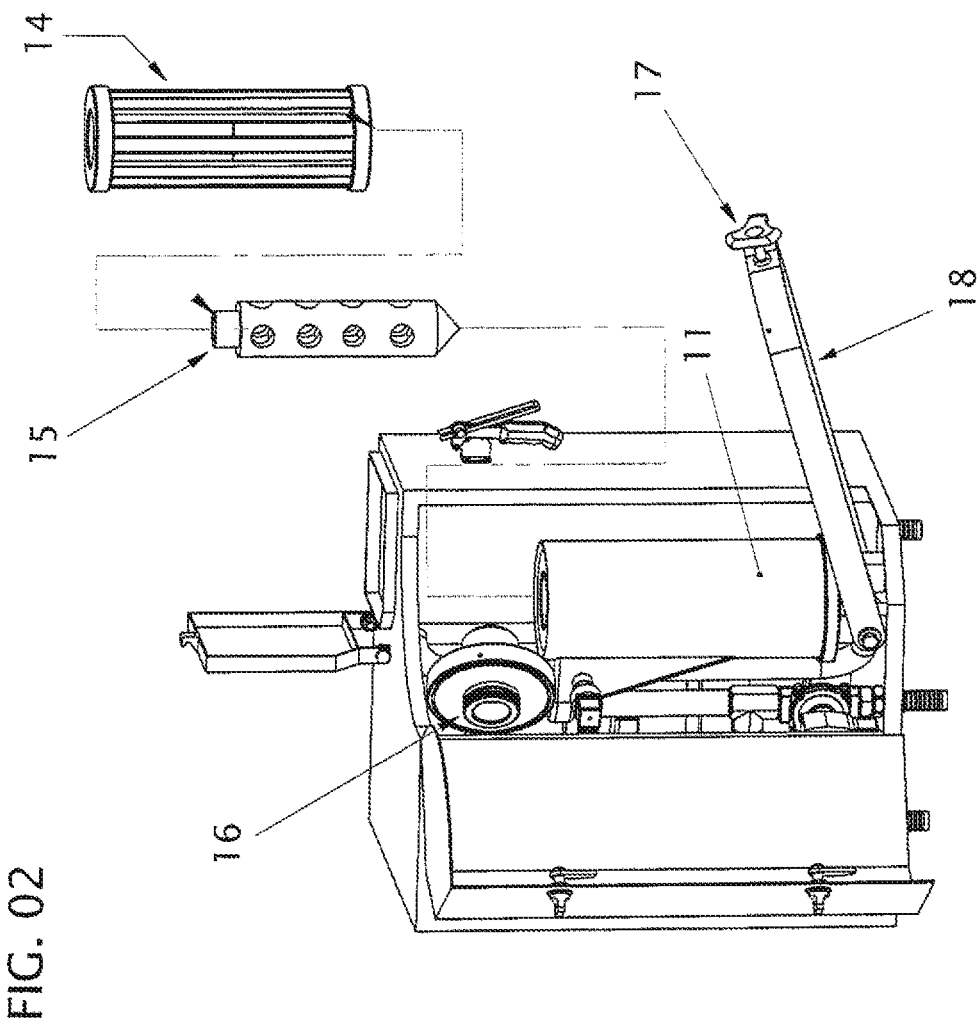
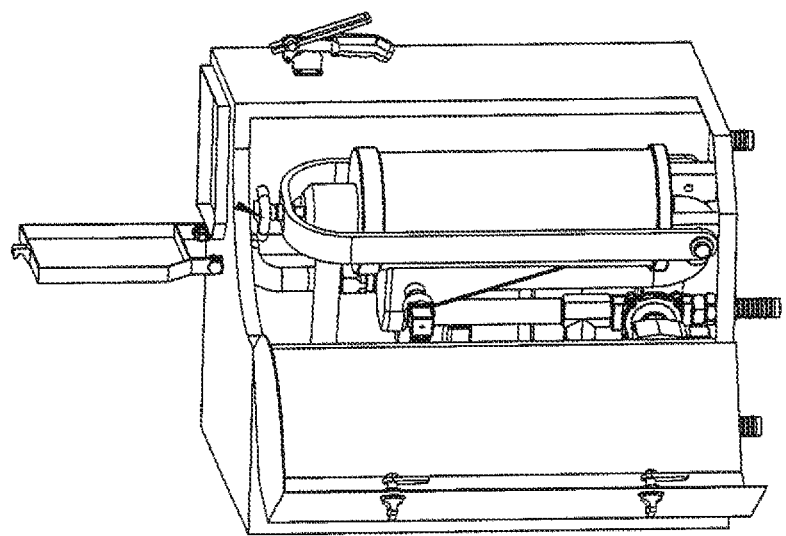
FIG. 02

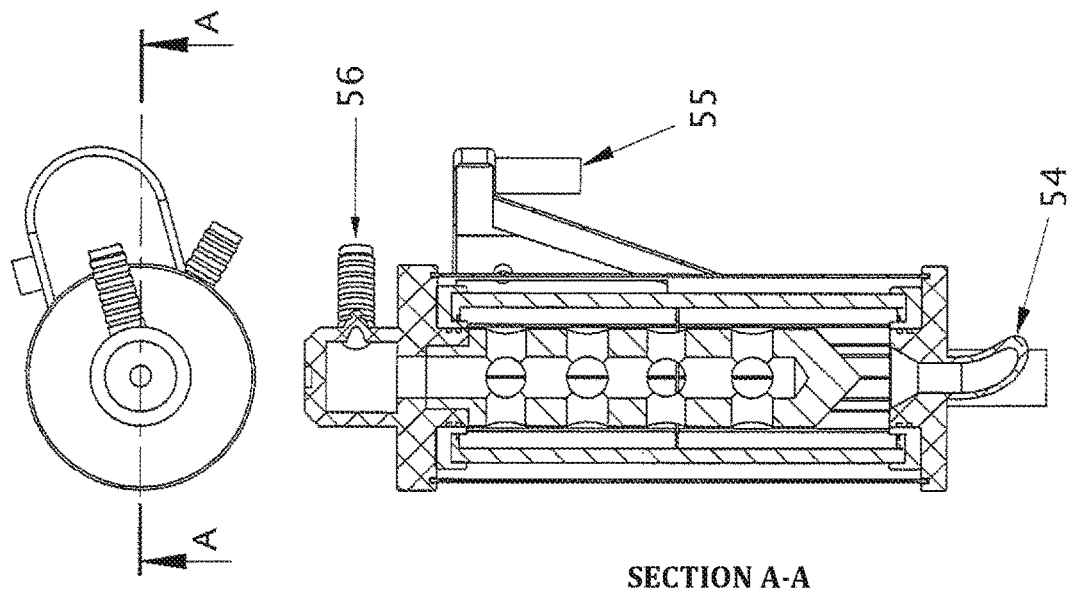
SECTION A-A
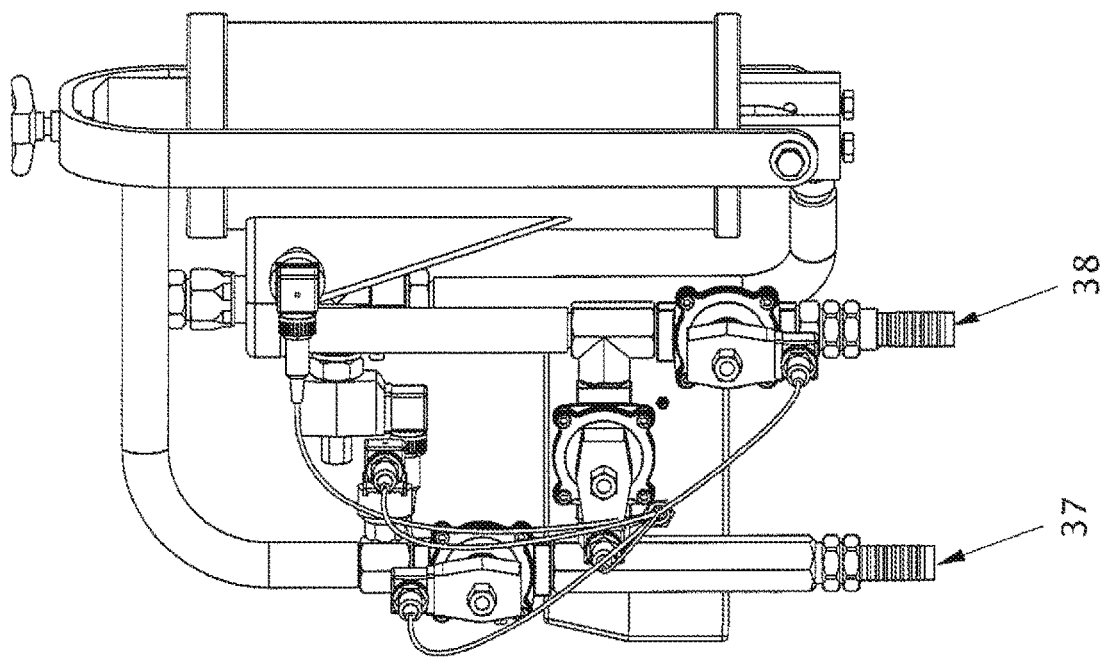
FIG. 06

SECTION A-A

FIG. 11
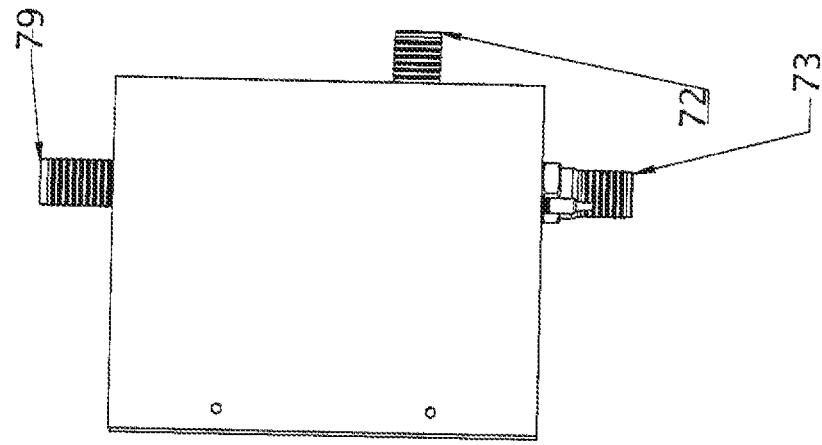
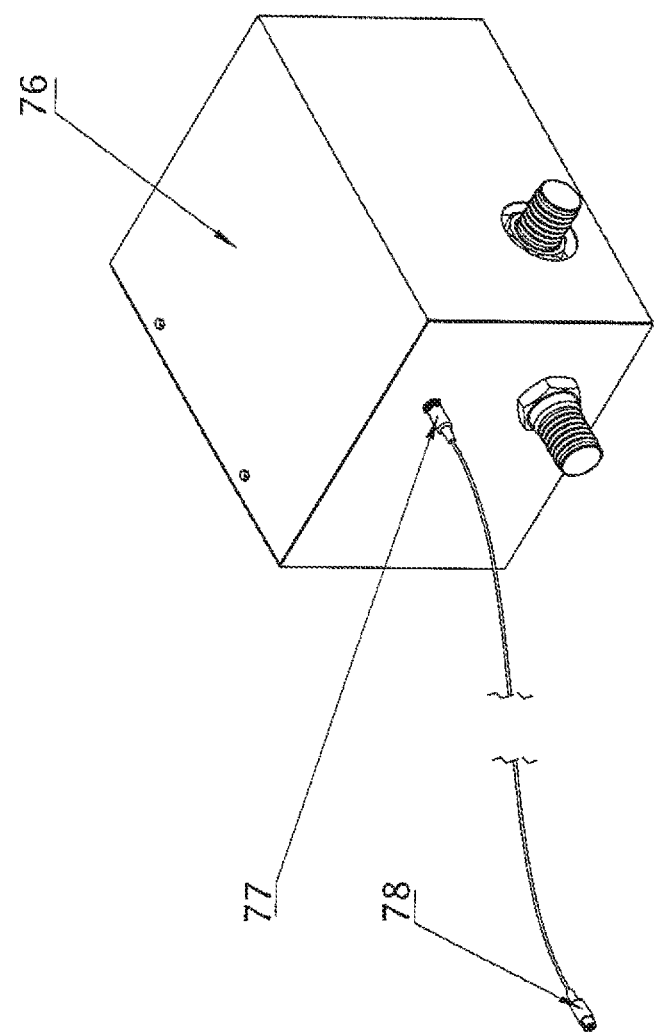

SELF-CLEANING FILTRATION SYSTEM FOR USE IN AGRICULTURAL SPRAYERS

FIELD OF THE INVENTION

The following invention report concerns the development of a self-cleaning filtration system applied to agricultural sprayers so that the operator does not get in contact with residues from the applied product, relying on a cooperative system of a filtering element and a settling compartment, where the system is managed by an electronic module, has obstruction sensors that communicate the electronic module that it should send a command to revert the liquid flow inside the filtering element by closing valves and opening others for cleaning, sending the dirty liquid into the settling filter, where solid residues will be retained, and, subsequently, the clean liquid will go to the equipment reservoir.

BACKGROUND OF THE INVENTION

The application of pesticides in plantations using a sprayer is of paramount importance to agriculture, as pests and diseases can be controlled by means of this equipment, rendering agricultural production viable.

Whatever the size of the cultivated area is, either in small, medium or large rural properties, farmers will need to apply some type of pesticide, since it is almost unlikely that, during the production cycle, the crop will not be affected by diseases, pests, and invasive plants.

Chemicals intended for the control of invasive plants and diseases are traded in concentrated form (Application 870170081021, dated Oct. 23, 2017, page 6/36 2/10), which requires dilution in water. In these cases, sprayers that atomize the liquid into droplets are usually employed.

Spraying consists of reducing a great amount of liquid to droplets and sprinkle them towards the desired target. A sprayer is a device able to produce droplets as a result of a certain pressure applied to a liquid.

Sprayers are tools or machines that are widely used in agriculture in order to help farmers fight weeds, insects, among others. Their major role is to allow the dosage of pesticide or fertilizer applications to be controlled in the targeted area.

A sprayer is primarily composed of a tank, a strainer, a pesticide pump, a pesticide control, a return line, line filters, and spray nozzles.

The tank is intended to store the liquid ready to be applied. The tank must be highly resistant with protection against ultraviolet rays.

The role of the strainer is to filter the prepared liquid before it passes through the pesticide pump.

The pesticide pump has the function of drawing the spray liquid from the tank and controlling the pressure of the spray liquid after it passes through the pesticide pump, this pressure is around 45 to 60 pounds to allow for a continuous flow of the previously prepared liquid, passing through the line filters and through the nozzles until it hits the target.

Pesticide control is done by turning spraying on and off. When it is turned on, the flow is directed to bars, and when it is turned off, the flow is directed to return (Patent application 870170081021, dated Oct. 23, 2017, page 7/36 3/10) to the tank.

The return line prevents the system from exceeding the pressure regulated by the pesticide control, the excess spray liquid moves from the pesticide control back to the tank through this return line.

The line filters have the role of filtering the spray liquid to avoid obstruction of the spray nozzles.

The spray nozzles have the role of turning the liquid into droplets and hit the target.

PRIOR ART PROBLEM

In the current filtering systems of sprayers, both the strainer and the line filters are cleaned manually and require disassembling and cleaning, with the line filters being the ones that most often require cleaning. This action results in the operator having direct contact with the filters used for filtering agrochemicals, with greater exposure of the operator to agrochemicals and greater risk of contamination. An example of this can be seen in the US document no. 20050205486, which shows a filtration device with a removable filter.

There are also self-cleaning filters, as in U.S. Pat. No. 7,192,528, which describes a self-cleaning filter system including an inlet fitting that is adapted to be inserted into an existing filter body. A spraying tube that has a plurality of outlets that fit slidingly into the inlet fitting is positioned on the existing filter ring discs and a compression member near one end of the ring discs applies compressive force to the ring discs. When the fluid enters the spraying tube, the compression of the inlet fitting on the ring discs is reduced to allow (Patent 870170081021 dated Oct. 23, 2017, page 8/36 4/10) the ring discs to separate from one another, while the pressure of the fluid is simultaneously imposed upon the ring discs by a plurality of outlets in order to clean the filter component. The parts included in the system can be used to convert a manual filter into a self-cleaning filter system.

However, there is no control and management of the filtering operation even in the self-cleaning system.

PROPOSED SOLUTION

Currently, no self-cleaning filtration system applied to agricultural sprayers having obstruction sensors and sensors indicating the need to replace filters or recommending the time to replace them is known in the prior art.

SUMMARY

Thus, due to considerations pertinent to the prior art previously discussed, one of the objectives of the present invention is to develop a filtration system applied to agricultural sprayers, with the system having several components that are described as follows:

The filtration unit (UF) is composed of a filtering element, a header, a filter body coupled to a head, solenoid valves and an NA pressure switch. This unit receives the mixture of water and pesticides (ADF) from inside the main tank of the equipment to the hoses and applicator nozzles.

The settling unit (UD) is composed of a reservoir suited for a paper filter. This unit receives residues with some amount of the ADF mixture from the filter after cleaning. This material must be ecologically disposed of (Patent 870170081021, dated Oct. 23, 2017, page 9/36 5/10) and the ADF will be cleaned and sent to the reservoir of the equipment through the return hose.

The supply unit (UA) is composed of valves that are electronically commanded. Its performance is set by the user who will choose, in the UE (electronic unit), how many liters of water should be poured into the main tank of the equipment and, once the selected value for the liquid has been reached, the UE unit acts on these valves discontinuing the flow and diverting the water to the reservoir tank.

The Plus filter system (SSF) model consists of LEDs, a manual cleaning button, an on/off button and an electronic board. Each LED provides different information, one LED informs that the system is on, another informs that the filter is dirty and yet another informs that cleaning is in progress. The purpose of this unit is to electronically control the ADF filtering action.

The master filtration system (SMF) model consists of an LCD screen, a numeric keypad, an on/off button, a manual cleaning button and an electronic board. The objective of this unit is to electronically command the ADF filtering action.

The Premium filtration system (SPF) model consists of a touch screen, a manual cleaning button, an on/off button and an electronic board.

DESCRIPTION

The present invention is illustrated by means of drawings representing the filtration system applied to agricultural sprayers, in such a way that the product can be fully reproduced by an appropriate technique, allowing for the full characterization of the functionality of the claimed object.

The figures that express the best (Patent 870170081021, dated Oct. 23, 2017, page 10/36 6/10) form or the preferred form of embodiment of the devised product are the basis of the descriptive part of the report, using detailed and consecutive numbering, which clarifies aspects that may be implied by the adopted representation in order to clearly determine the patent sought here.

These figures are merely illustrative and may present variations as long as they do not deviate from the initial application.

In this case:

FIG. 2 shows the location of the filtering element;

FIG. 6 shows the strainer;

FIG. 11 shows the supply unit (Patent 870170081021, dated Oct. 23, 2017, page 11/36 7/10).

Figure 1:
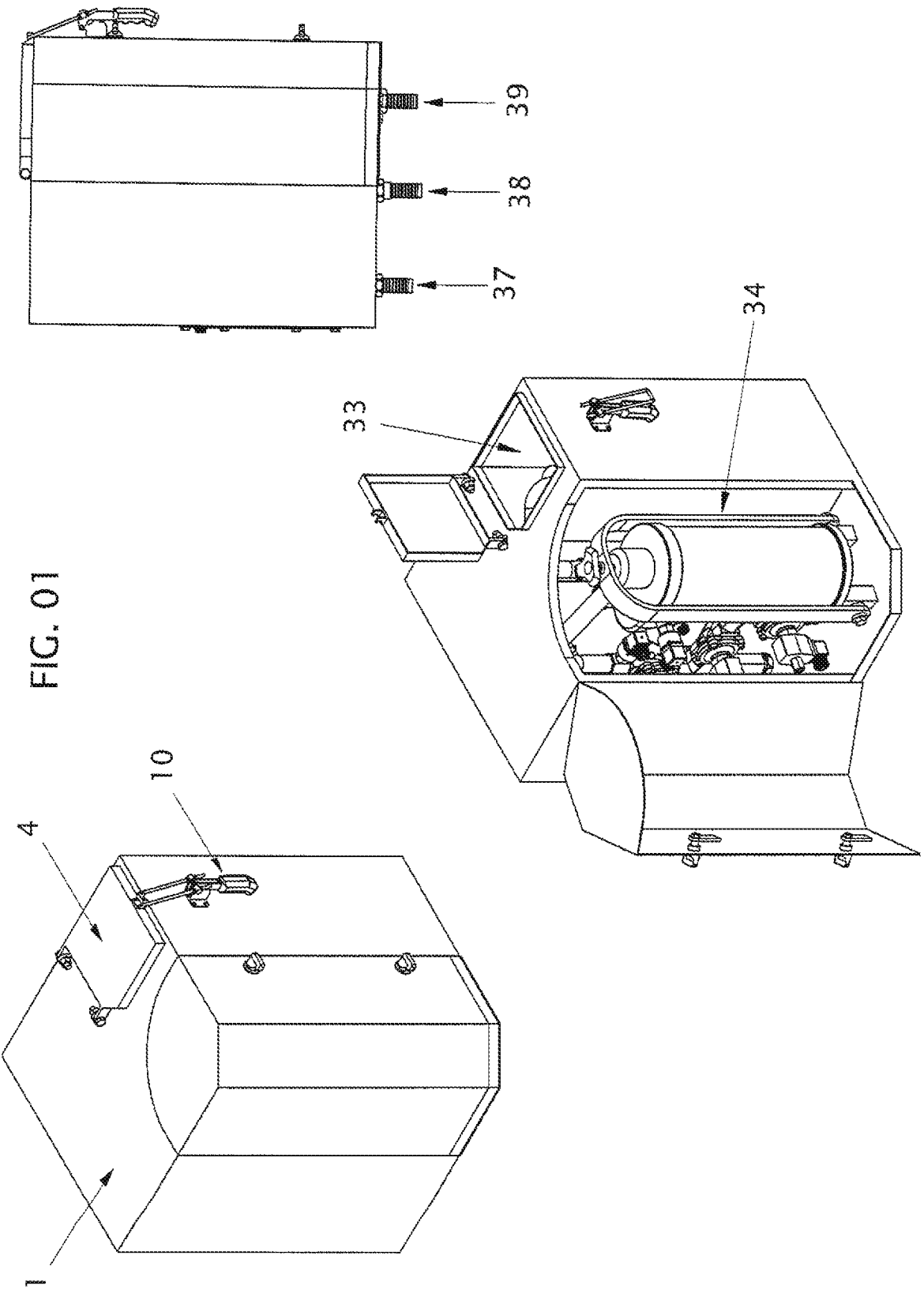
FIG. 1 shows a perspective of the proposed filtration system.
Figure 3:
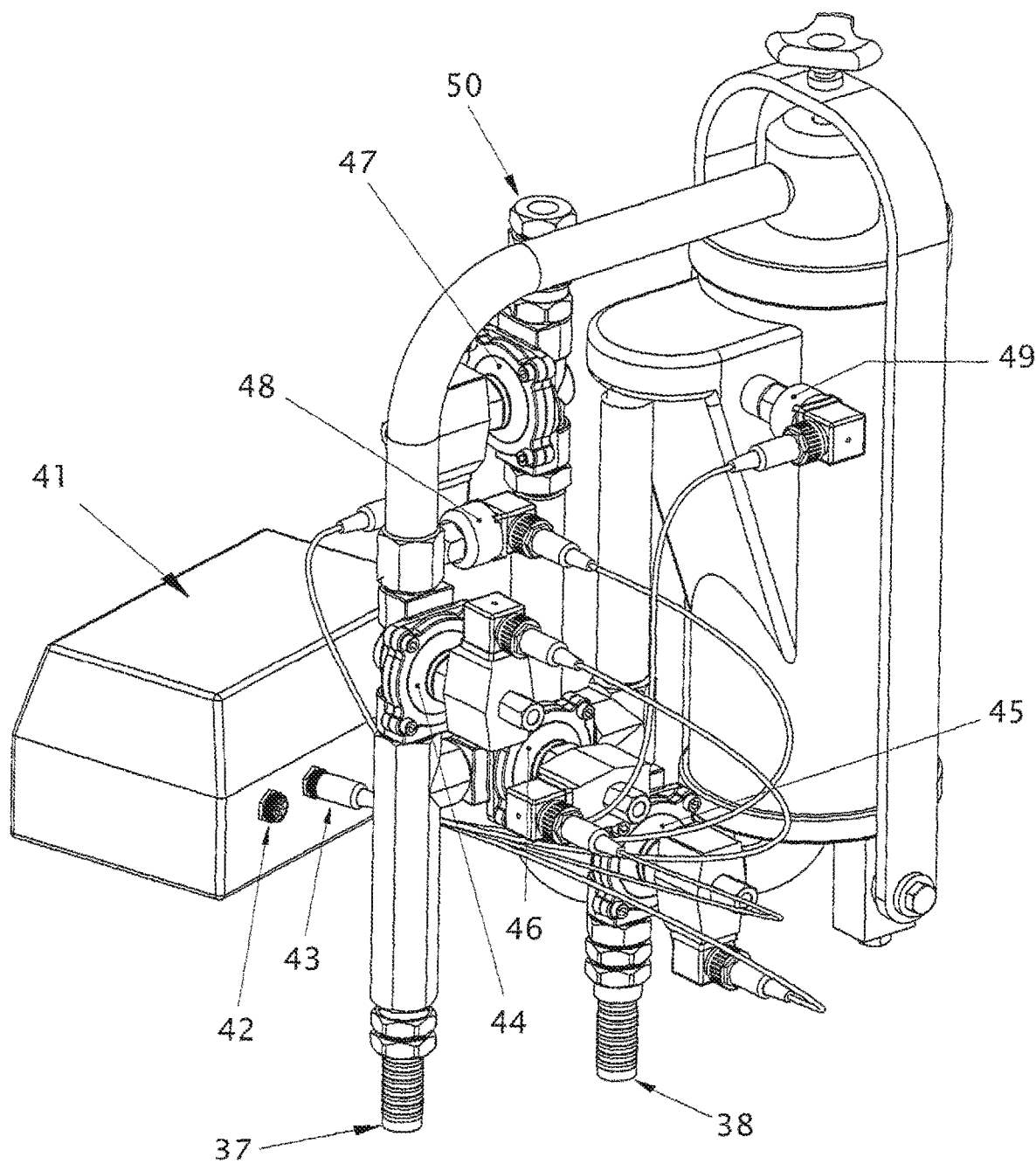
FIG. 3 shows the assembly of the components of the invention.

The proposed filtration system uses a casing (1) containing a settling compartment (33) provided with a lid (4) and an open/close clamp (10) to maintain the settling filter (36), a compartment (34) of the filtering element or self-cleaning filter (14), provided with a lid (35), to maintain the self-cleaning filter (14), said casing (1) also containing, at its base, an inlet for the fluid to be filtered (37), a pesticide control (38) outlet, and a return (39) outlet.

Inside the compartment (34) of the filtering element (14), there is a supporting cylinder (11), and inside this supporting cylinder (11) the fluid diffuser (15) and the filtering element (14) are seated, and this supporting cylinder (11) is secured by a fixing handle (18) and by a fixing spindle (17), and said handle (18) can tilt, releasing the cylinder head (16) and, consequently, the filtering element itself (14) for replacement.

Said filtering element (14) is composed of internal vanes (65) and external vanes (66), which are held in grooves present on the flanges (63 and 64), where said flanges (63 and 64) are attached to the upper and lower fasteners (67), and a 150µ cylindrical mesh (68) is arranged around it.

The filtering element assembly (14)| is controlled by an electronic module (41) containing an outlet connector for IHM (42) and another connector (43) that is connected to the valves (44, 45, 46, and 47), and said module also controls the primary pressure transducer (48) and the secondary pressure transducer (49), and it is also possible to see the inlet for the fluid to be filtered (37), the outlet for pesticide control (38), and the outlet (50) for the settling filter (36).

Figure 4:
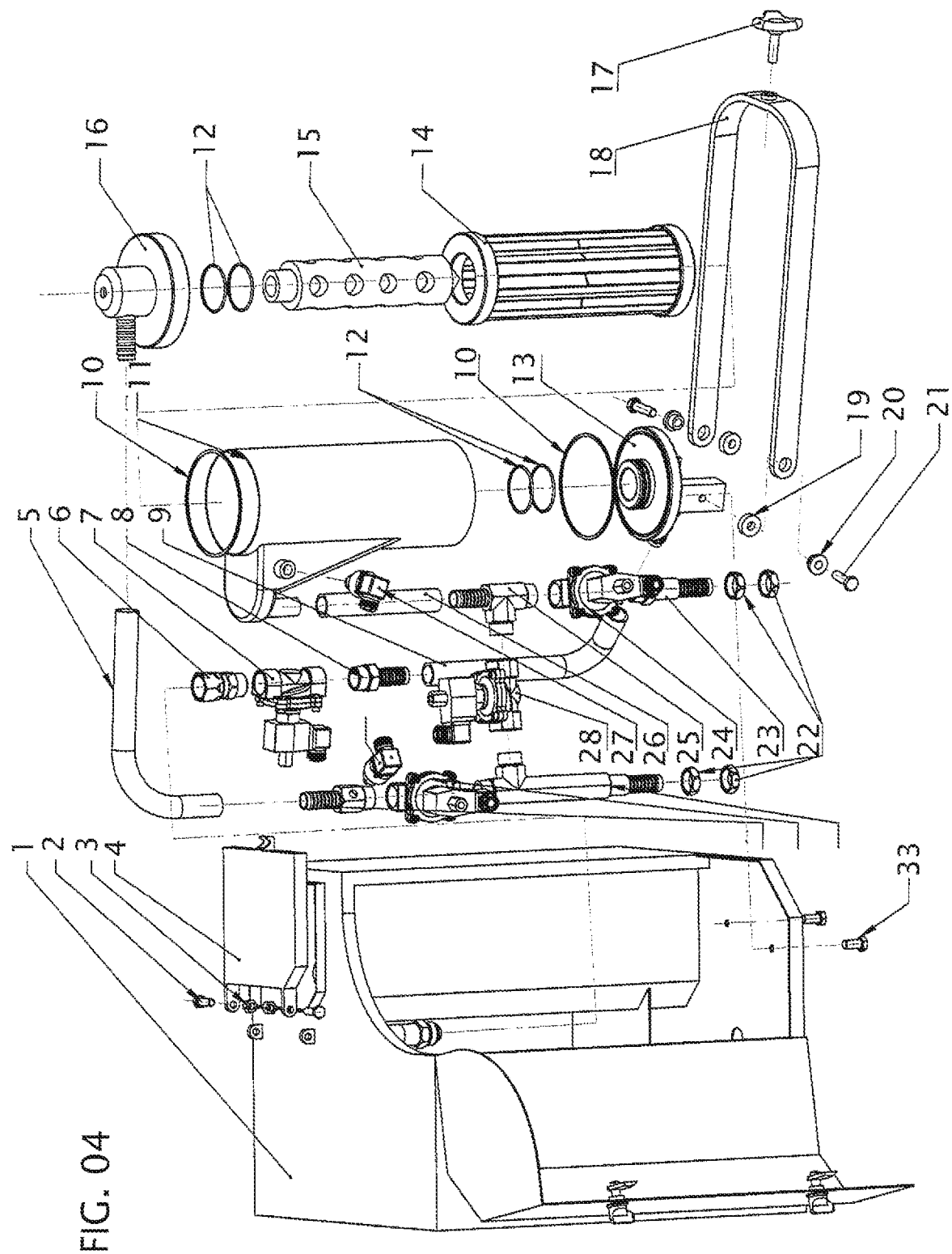
FIG. 4 shows an exploded view of the equipment.
Figure 5:
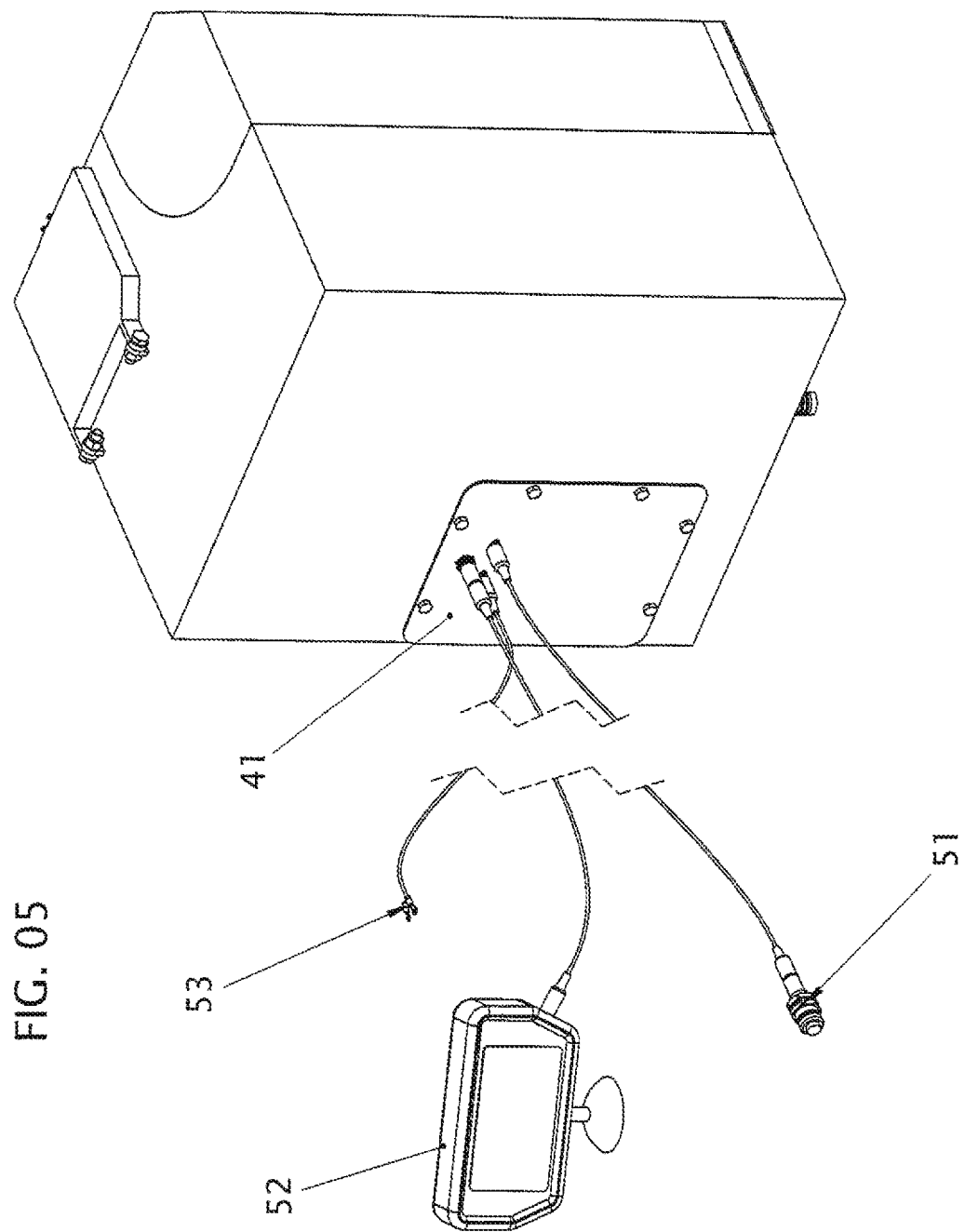
FIG. 5 shows a perspective of the electronic assembly.
Figure 7:
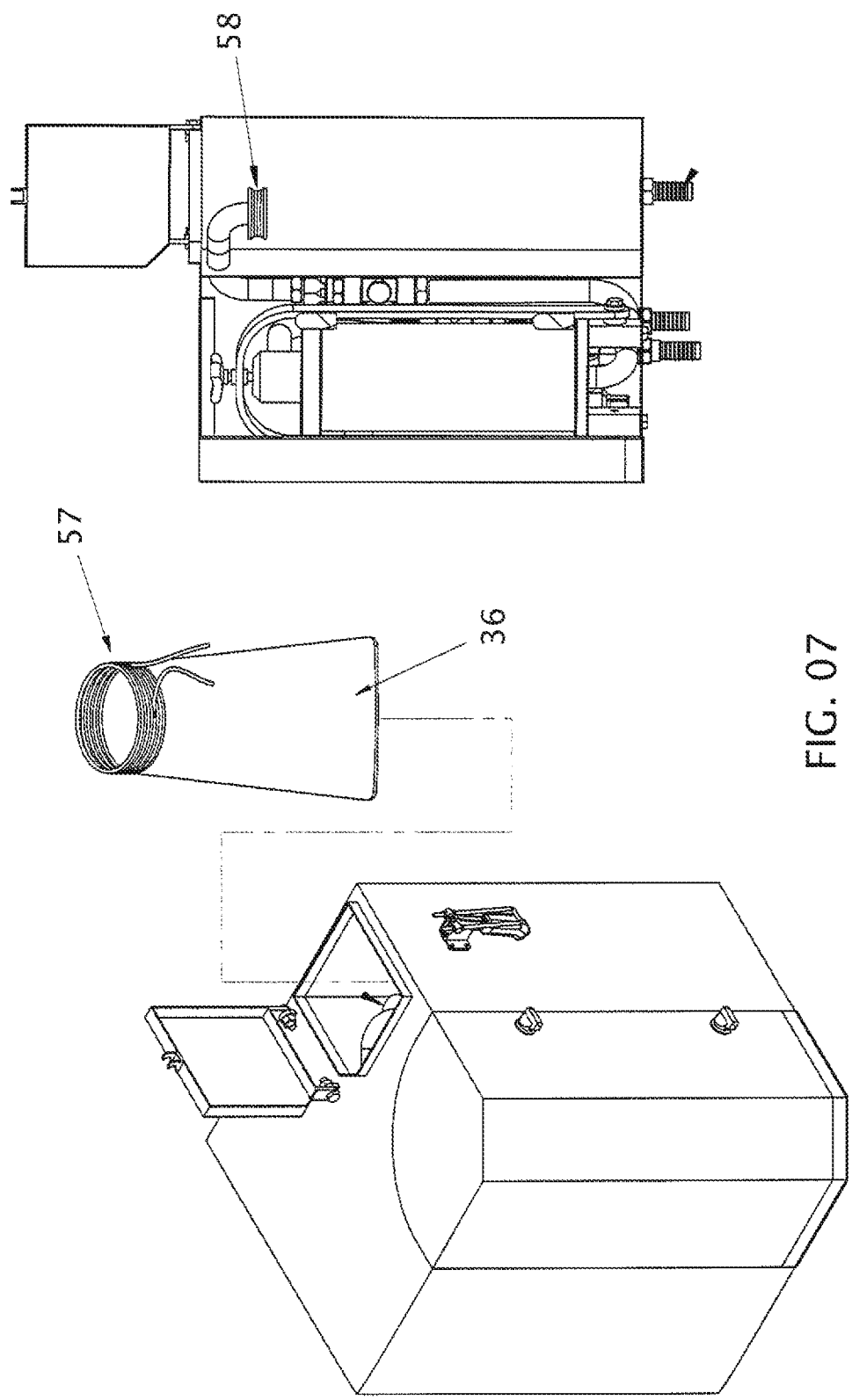
FIG. 7 shows a perspective of the settling filter.
Figure 8:
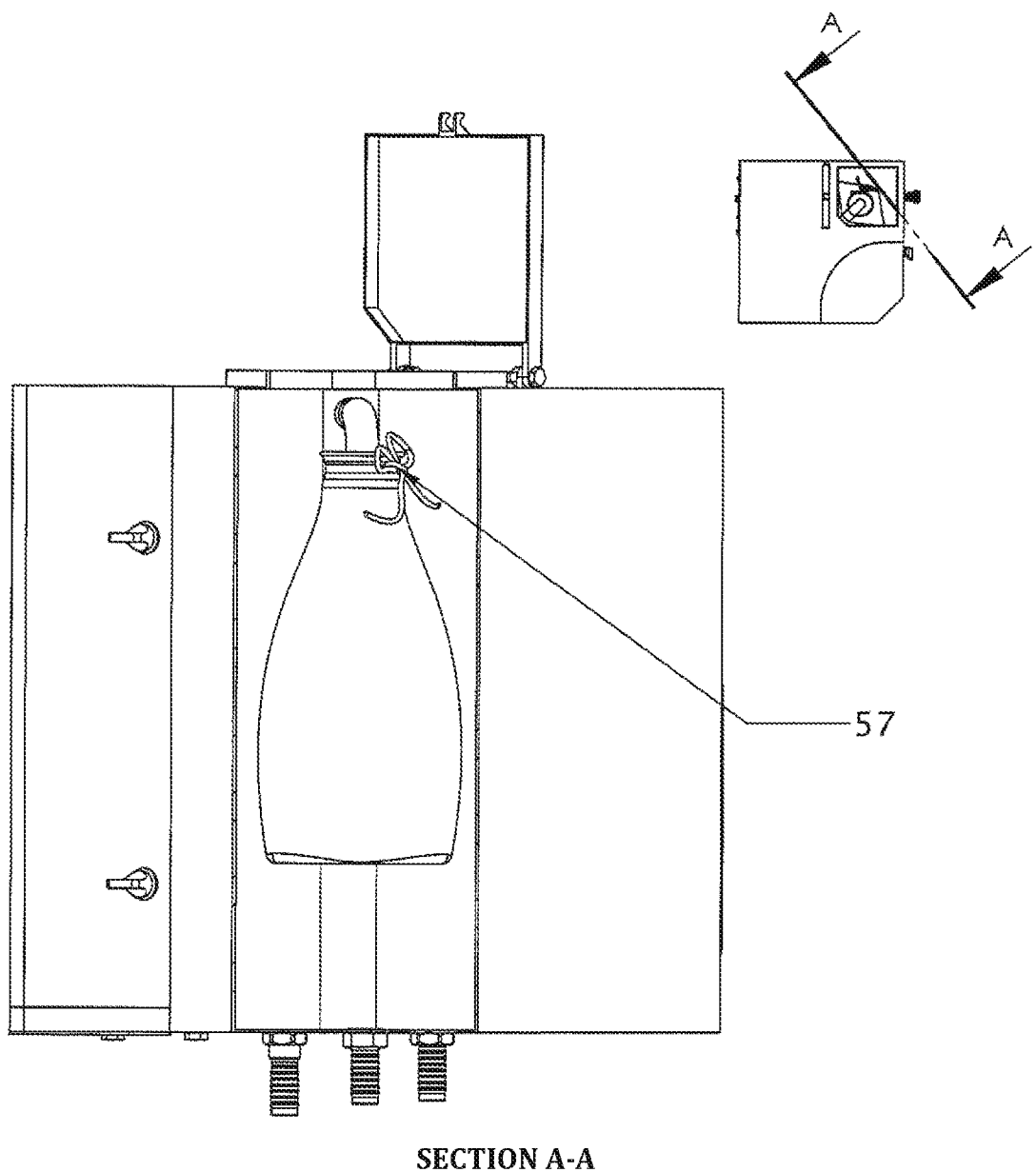
FIG. 8 shows the assembly of the settling filter.

FIG. 04 shows an exploded view of the equipment, in which we can see the casing (1), a screw (2) and a nut (3) for fixing the lid (4), a primary hose (5), an adapter (6), a solenoid valve (7), an NPT 1' terminal (8), a hose (9), the sealing ring (10) of the cylinder (11) of the filter (14), a sealing ring (12), the base (13) of the cylinder (11) of the filter (14), a fluid diffuser (15), the head (16) of the cylinder (11), a spindle (17), the fixing handle (18) of the cylinder (11), a bushing (19), a flanged bushing (20), a screw and a nut (21 and 22), an NPT panel terminal 1'×1 (23), a solenoid valve (24), an NPT T adapter 1]×1'×1' (25), a secondary hose (26), a secondary pressure transducer (27), a solenoid valve (28), a long panel terminal 1'×1'×1' (29), an NA solenoid valve (30), an NPT terminal 1'×NPT ¼×1' (31), a primary pressure transducer (32), and an M12×30 screw (33).

The electronic module (41) allows three outlets, one of them for connection to the spray shutdown sensor (51), another for connection to the HMI unit (52) and the other (53) connected to fittings connected to the equipment battery.

Once the spray shutdown sensor of the equipment detects that spraying was discontinued by the operator to perform maneuvers, for example, in conjunction with information from the pressure transducers (27 and 32), the electronic unit (41) will send a command for the valves to operate, so that they invert the flow in the filter, sending this material to the solenoid valve (47), which will be open and will send the liquid to the settling unit, thus performing the cleaning operation. The liquid comes from the settling unit, which has a filter to retain micro particles arising from the strainer and then returns to the reservoir of the equipment.

In section A-A of FIG. 6, we can see the outlet for the settling filtration fluid (54), the filter outlet (55) and the fluid inlet (56) at the upper portion of the filter (14).

The settling filter (36) contains rigging (57) to be tied to the end of the flange (58), and said filter (36) must be replaced periodically and disposed of in an environmentally friendly way.

Figure 9:
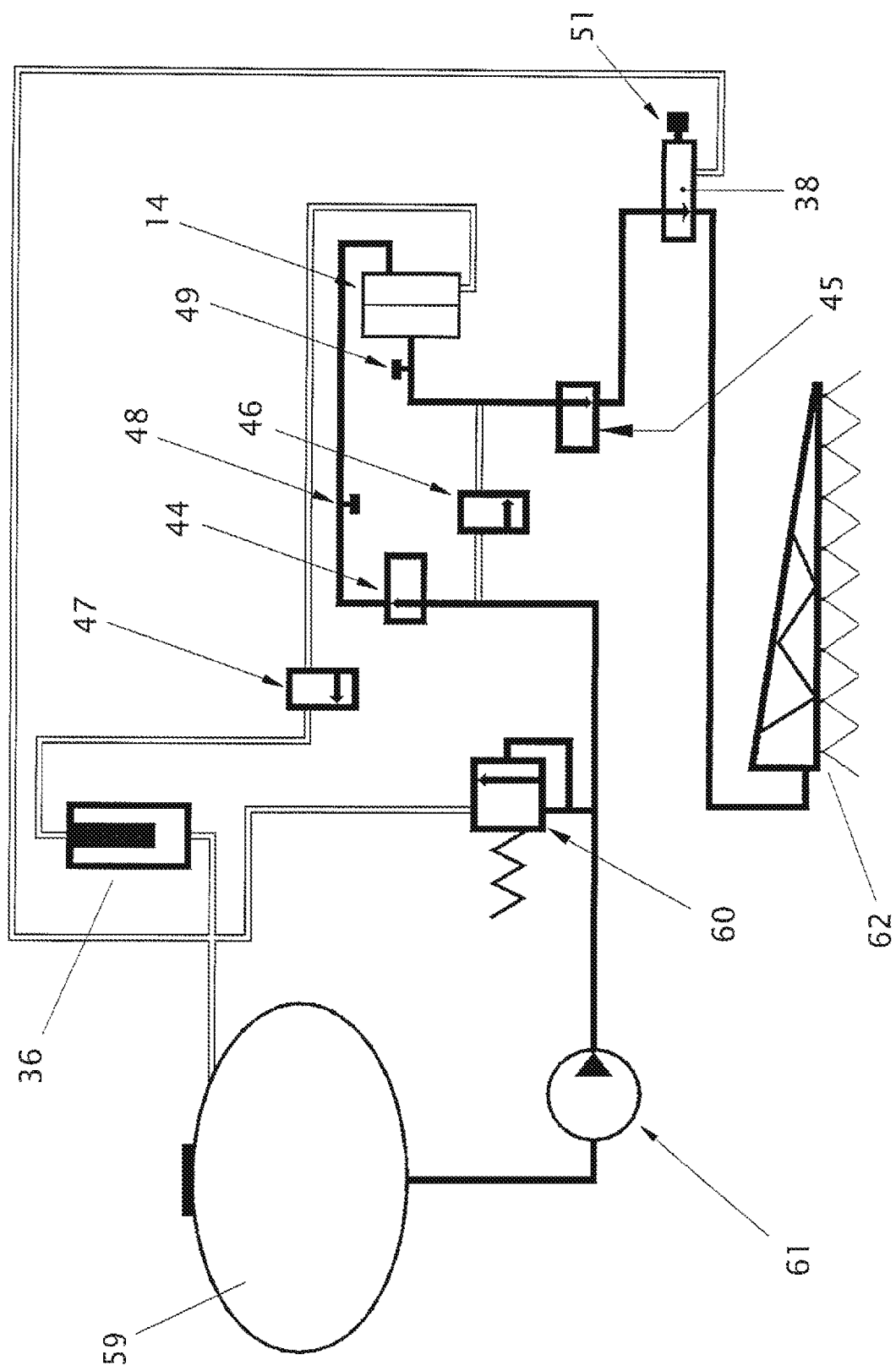
FIG. 9 shows an example of the system as a whole.
Figure 10:
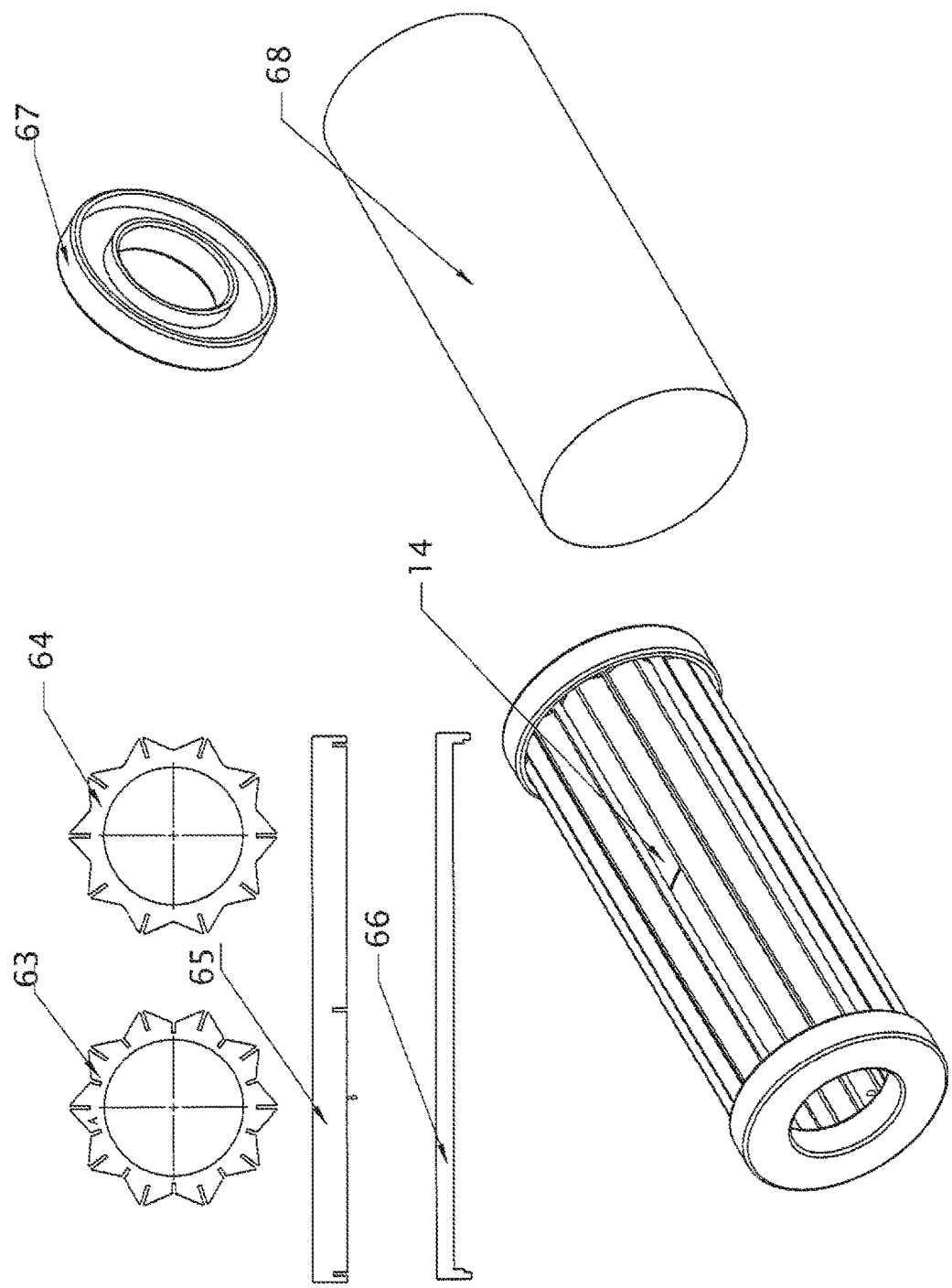
FIG. 10 shows the self-cleaning filter and its constituent parts.
Figure 12:
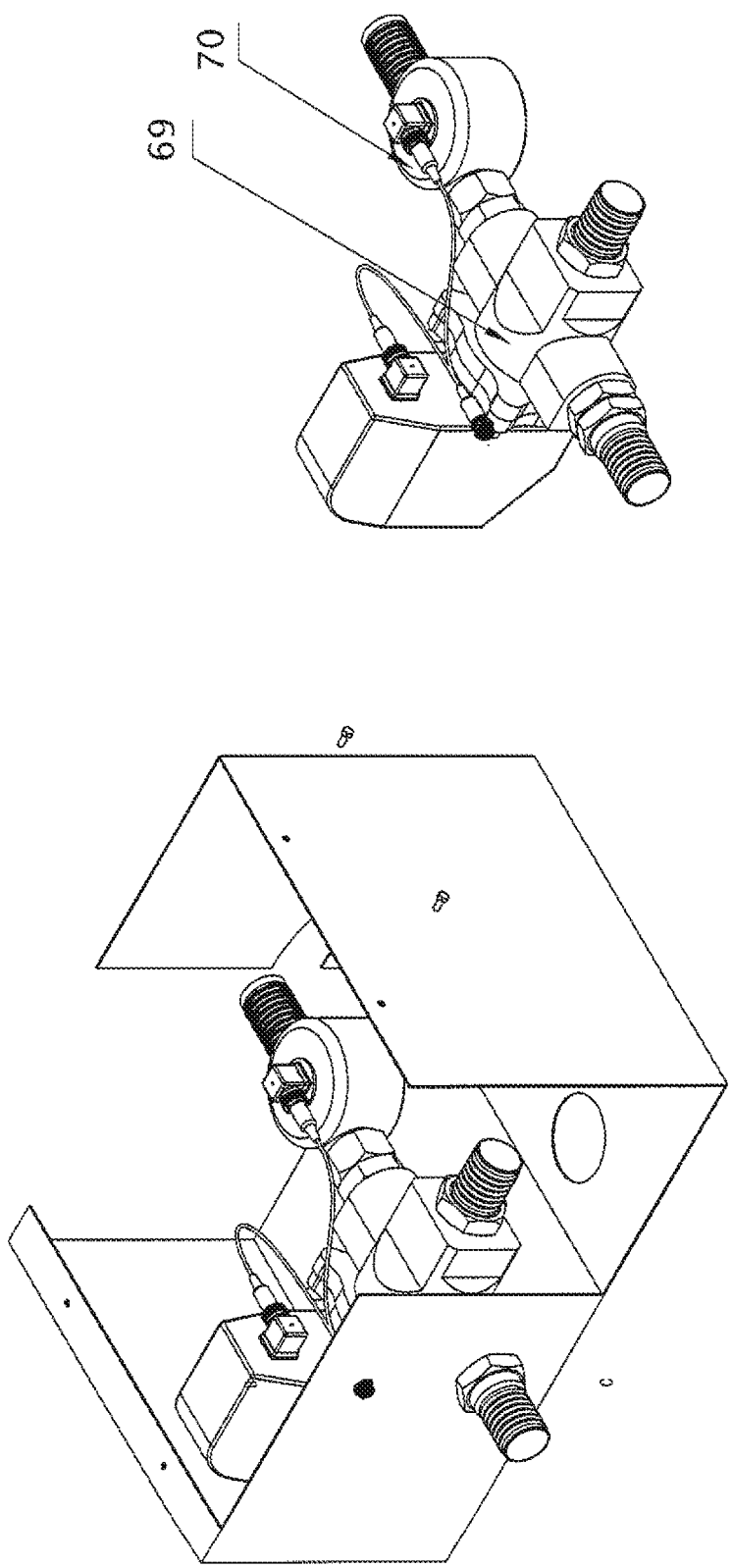
FIGS. 12 and 13 show the supply unit and exploded views.
Figure 13:
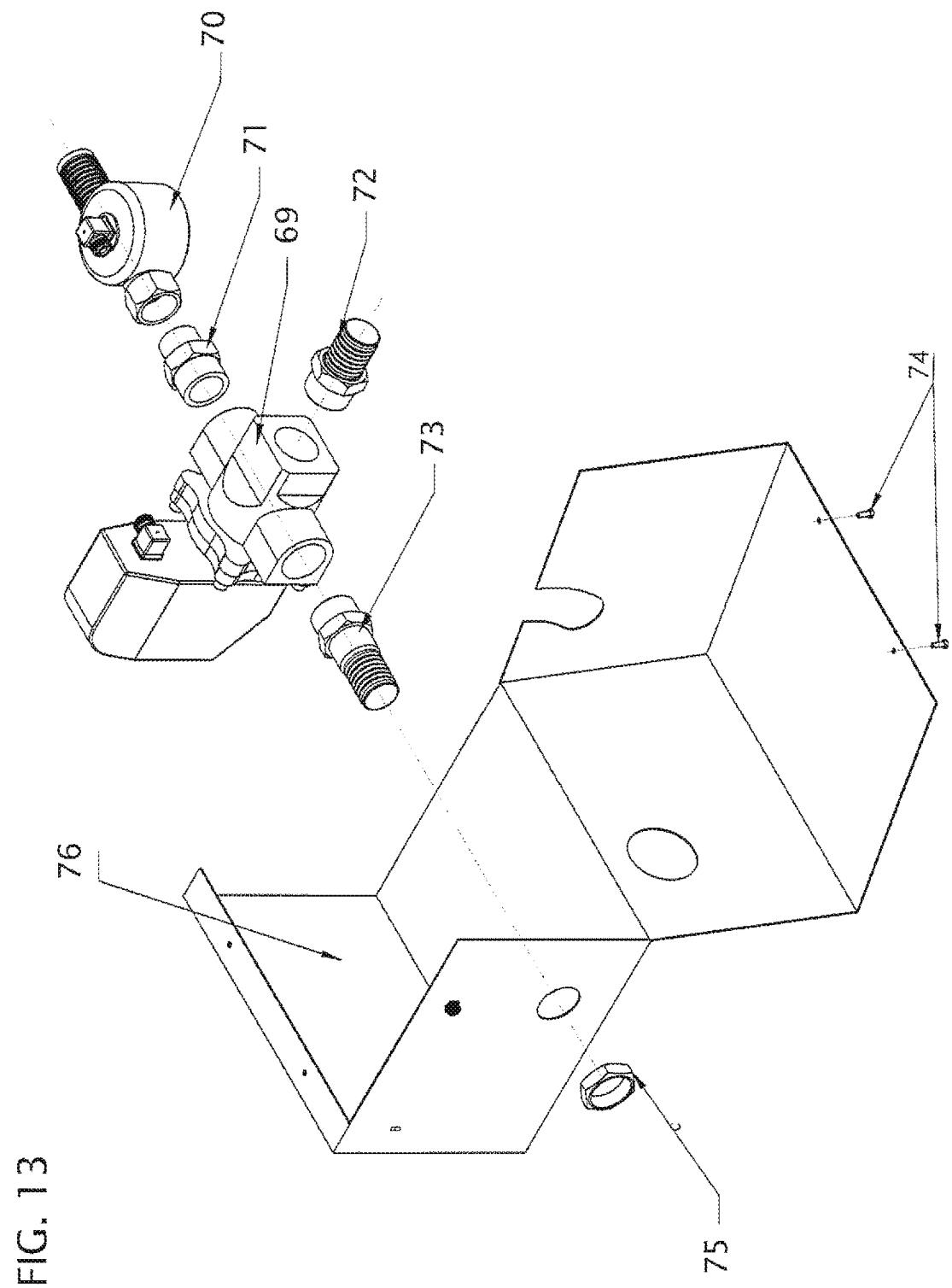

FIG. 9 shows the internal circuit including the tank/reservoir (59), settling filter (36), relief valve (60), pesticide pump (61), valves (44, 45, 46 and 47), primary (48) and secondary (49) pressure transducers, filtering element (14), spray shutdown sensor 51), pesticide control (38), and spray nozzles (62).

At the time of spraying, the water/pesticide mixture fluid gets out of the tank (59), passes through the feeding pump (61) and then through the hose and gets into the UNF solenoid valve (7), which will be open. This fluid will be released into the filter by a fluid diffuser (15). The filtration mash of the filtering element (14) will retain potential solid particles, and the liquid will proceed to the applicator nozzles (62) located on the bars.

The supply unit (UA) that is composed of a three-way valve (69), which receives, connected to it, an adapter (71) and two terminals (72 and 73), with the adapter (71) connected to a flow meter (70), the terminal (73) being connected to a nut (75) that secures this terminal (73) to the housing (76), which is closed by screws (74), in such a way as to expose the terminals (72 and 73), the terminal (79) of the flow meter (70) and the connector (77) with the cable and its connector (78) in the electronic unit. (Patent application 870170081021, dated Dec. 13, 2017, page 14/36 10/10).

Another function of this system is to prevent manual contact of the operator with chemical elements and allow for taking care of the environment, as most farmers clean the existing filters in the sprayers while filling their tanks most often on river banks.

The invention claimed is:

1. A self-cleaning filtration system applied to agricultural sprayers, comprising:
   a filter element (14);
   a settling filter (36);
   a casing (1) adapted to receive a settling compartment (33) with a lid (4); and
   an open/close clamp (40) adapted to maintain the settling filter (36), wherein a filter element compartment (34) of the filter element (14) is provided with a lid (35) to maintain the filter element (14), wherein said casing (1) includes an inlet for a fluid to be filtered (37), an outlet for pesticide control (38) and an outlet for the settling filter (36) and for subsequent return to a reservoir (39);
   wherein the filter element compartment (34) of the filter element (14) has a supporting cylinder (11) provided inside the filter element compartment (34),
   the filter element compartment (34) of the filter element (14) further includes a fluid diffuser (15), wherein the filter element (14) and the fluid diffuser (15) are seated inside the supporting cylinder (11), wherein the supporting cylinder (11) is secured by a fixing handle (18) and a fixing spindle (17), wherein the fixing handle (18) is adapted to tilt to release a cylinder head (16) and the filter element (14),
   wherein the filter element (14) is provided with internal vanes (65) and external vanes (66) that are held in grooves formed on first flanges (63, 64) of the filter element (14), wherein the first flanges (63, 64) are attached to upper and lower fixers of the filter element (14), the filter element (14) further includes 150μ cylindrical mash (68) arranged around the filter element (14),
   wherein the filter element (14) is controlled by an electronic module (41) having a IHM outer connector (42) and another connector (43) connected to valves (44, 45, 46, 47) provided in the system, wherein the electronic module (41) controls a primary pressure transducer (48), and a secondary pressure transducer (49), wherein the inlet for the fluid to be filtered (37), the outlet for pesticide control (38), and the outlet (50) for the settling filter (36) are visible on the casing (1);
   wherein the electronic module (41) is provided with three second-outlets and is configured to control the outlets, wherein one second-outlet being connected to a spray down sensor (51), another second-outlet being for connection to a HMI unit (52) and other second-outlet being connected to an equipment battery;
   wherein the filter element (14) having a fluid outlet for settling filtration (54), a filter outlet (55) and a fluid inlet (56) at an upper part of the filter element (14);
   wherein the settling filter (36) containing rigging (57) to be tied to an end of a second flange (58) of the filter element (14); and
   wherein the system further includes a supply unit (UA) having a three-way valve (69) adapted to receive an adapter (71) and two first terminals (72 and 73), wherein the adapter (71) is connected to a flow meter (70), and a first one of the two first terminals (73) is connected to a nut (75) that secures the first one of the two first terminals (73) to a housing (76), which is closed by screws (74), in such a way as to expose the two first terminals (72 and 73), and a second terminal (79) of the flow meter (70).

* * * * *